US011759887B2

(12) United States Patent
Li

(10) Patent No.: US 11,759,887 B2
(45) Date of Patent: *Sep. 19, 2023

(54) ENGRAVING MACHINE

(71) Applicant: Tong Li, Haslett, MI (US)

(72) Inventor: Tong Li, Haslett, MI (US)

(*) Notice: Subject to any disclaimer, the term of this patent is extended or adjusted under 35 U.S.C. 154(b) by 135 days.

This patent is subject to a terminal disclaimer.

(21) Appl. No.: 17/542,441

(22) Filed: Dec. 5, 2021

(65) Prior Publication Data

US 2022/0088707 A1    Mar. 24, 2022

Related U.S. Application Data

(62) Division of application No. 16/987,529, filed on Aug. 7, 2020, now Pat. No. 11,446,761.

(Continued)

(51) Int. Cl.
*B23K 26/08*     (2014.01)
*B23K 26/70*     (2014.01)
*B23K 26/364*    (2014.01)

(52) U.S. Cl.
CPC ........ *B23K 26/0876* (2013.01); *B23K 26/364* (2015.10); *B23K 26/702* (2015.10)

(58) Field of Classification Search
CPC .............. B23K 26/0876; B23K 26/702; B23K 26/362; B23K 37/0235; B23K 26/127; B23K 26/10; B23K 26/36; B23K 37/0408; B23K 26/0096; B23K 26/0604; B23K 26/364; B23K 26/40; B23K 2101/04; B23K 26/02; B23K 26/032; B23K 26/06; B23K 26/0823; B23K 26/142; B23K 26/16; B23K 26/0648; B23K 26/083; B23K 26/0869; B23K 26/38; B23K 37/0217; B23K 37/0435; B23K 26/0643; B23K 26/12; B23K 37/0288; B23K 10/006; B23K 2103/50; B23K 26/046; B23K 26/064; B23K 26/08; B23K 26/082; B23K 26/0838; B23K 26/0853; B23K 26/34; B23K 26/361; B23K 26/382; B23K 37/02; B23K 37/0211; B23K 37/047
USPC ........ 219/121.68, 121.78, 82, 121.39, 121.6, 219/121.62, 121.67, 121.69, 121.73, 219/121.74, 121.77, 121.8, 121.82, 219/121.83, 121.84, 121.86
See application file for complete search history.

(56) References Cited

U.S. PATENT DOCUMENTS 5,672,285 A    9/1997  Kondo et al.
8,309,881 B2  11/2012  Li
(Continued)

FOREIGN PATENT DOCUMENTS

CN    200992095 Y    12/2007
CN    205798698 U    12/2016

*Primary Examiner* — Chris Q Liu
(74) *Attorney, Agent, or Firm* — Young Basile Hanlon & MacFarlane, P.C.

(57) ABSTRACT

A laser engraving machine with a three-point suspension system and an inverted X-Y axis support system wherein the X-axis beam is to and mounted below the Y-axis beams and the Y-axis beams are mounted inwardly of the outer ends of the X-axis beam and are structurally integrated with the machine housing. In addition, a counterweight in the form of a second, independently activatable laser is added to the drive belt to reduce or eliminate vibration during rapid reciprocal movement of the tool during an engraving process.

2 Claims, 3 Drawing Sheets

Related U.S. Application Data

(60) Provisional application No. 62/986,056, filed on Mar. 6, 2020.

(56) References Cited

U.S. PATENT DOCUMENTS

| | | | |
|---|---|---|---|
| 9,168,760 B2 | 10/2015 | Li | |
| 2004/0040943 A1* | 3/2004 | Lundberg | G06K 1/126 |
| | | | 219/121.68 |
| 2004/0045941 A1* | 3/2004 | Herzog | B29C 64/153 |
| | | | 219/121.6 |
| 2007/0035777 A1 | 2/2007 | Kintner | |
| 2011/0174789 A1* | 7/2011 | Li | B44B 7/00 |
| | | | 219/121.68 |
| 2016/0059363 A1* | 3/2016 | Ardisson | B23K 26/032 |
| | | | 219/121.67 |
| 2017/0057008 A1* | 3/2017 | Liu | G06T 7/0004 |

* cited by examiner

ENGRAVING MACHINE

CROSS-REFERENCE TO RELATED APPLICATIONS

This application is a divisional application of U.S. patent application Ser. No. 16/987,529, filed Aug. 7, 2020 which claims priority to U.S. Provisional Patent Application Ser. No. 62/986,056, filed on Mar. 6, 2020, the entire disclosures of which are incorporated by reference.

FIELD OF THE INVENTION

This document describes an improved laser engraving machine for engraving objects made of various materials including stone, metal wood and plastic with letters, numbers, images and combinations thereof, and more particularly to an engraving machine having a novel arrangement of X and Y axis tool support and guidance structures to provide improved structural strength, thereby allowing for the use of lighter materials of construction. The disclosure further describes a device having a counter-weighted X-axis laser drive, which substantially eliminates vibration and loss of image resolution in the engraving process.

BACKGROUND OF THE INVENTION

Engraving machines, particularly those using lasers to implement the engraving process, typically comprise a cabinet that can be mounted on a table or the like over an object such as a grave marker to be engraved. Within the cabinet there are X and Y axis support beams for a stepper motor drive system to move the laser tool incrementally and under the control of a digital program through a two-dimensional field over the object surface to be engraved at a fixed focal distance. The X-axis beam directly supports the laser for movement in the X direction while the Y-axis beams extend under and provide support to the X-axis beam for incremental translation or movement in the Y-axis direction.

As shown in FIG. 1, the prior art approach necessarily locates the Y-axis beams 14 and 16 supporting the X-axis beam 12 under the X axis beam and as far apart as possible to give the laser tool 10 maximum translation capability. The Y-axis beams 14 and 16 are tied at their opposite ends into the front and rear side panels of the cabinet and add little rigidity to the cabinet structure. See, for example, U.S. Pat. No. 10,654,127. Because the beams 14 and 16 are so far apart, the laser cabinet must be made of a heavier gauge, high tensile strength metal, such as steel, in order to have adequate rigidity to preserve resolution in the engraving process and not allow any flexing or vibration in the housing during the very rapid back and forth movement of the laser tool.

SUMMARY OF THE INVENTION

In accordance with the present disclosure, the first improvement described involves an inversion of the X and Y stepper motor track support beams so that the X-axis support beam is mounted under the Y-axis support beams. This allows the Y-axis support beams to be brought closer together adding rigidity to the frame of the laser housing and reducing or eliminating the use of steel in the construction of the laser housing in favor of the use of a more lightweight material such as aluminum.

A second aspect of the disclosure provided herein involves the reorientation of the continuous loop belt which is used to incrementally translate the laser tool along the X-axis so that the axes of rotation of the end wise pulleys are vertical rather than horizontal. In addition, a counterweight is added on the side of the belt opposite the engraving tool. The counterweight, therefore, moves in the opposite direction of the laser during incremental reciprocal movement, giving rise to a conservation of momentum, which dramatically reduces vibration and improves laser engraving accuracy and image resolution in the engraving process.

As further described hereinafter, the counterweight, best constructed to substantially, if not identically, equal the mass of the laser tool, can be a second laser which is independently activated to carry out an additional portion of the engraving process simultaneously with the forward mounted laser. This of course adds complexity to the programming process but that technology is within the skill in the art. It will also be noted that the device shown in FIG. 3 of the drawings hereinafter described corresponds substantively with the three-point laser support and guidance system disclosed in my U.S. Pat. No. 10,654,127, the entire disclosure of which is incorporated herein by reference.

DETAILED DESCRIPTION OF THE ILLUSTRATIVE EMBODIMENT

Figure 1:
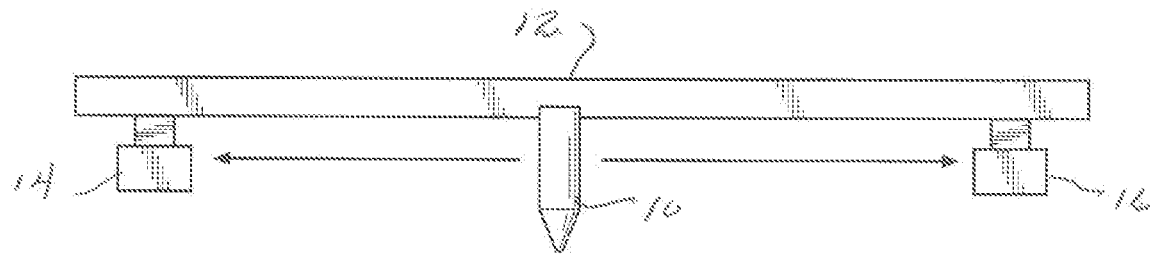
FIG. 1 is diagrammatic view of the prior art X and Y beam support structure.

Reviewing, the prior art X and Y beam structure diagrammatically shown in FIG. 1, it should be noted that the X-axis support beam 12 is mounted over the widely spaced Y-axis support beams 12 and 14 to allow the laser tool 10 to realize maximum translation scope in the positive and negative X-axis direction.

Figure 2:
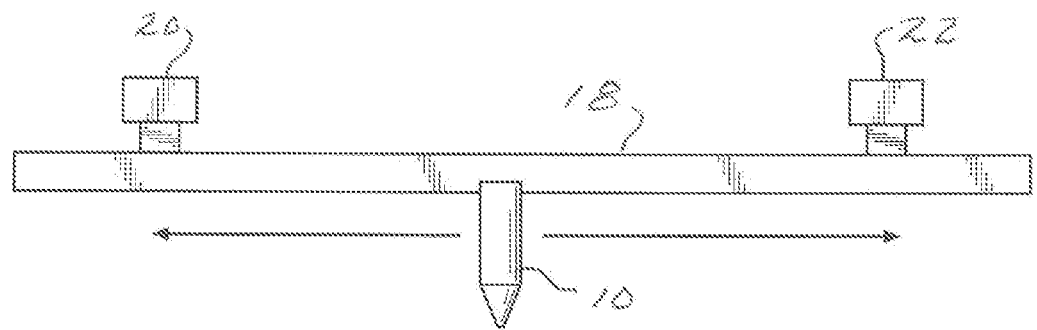
FIG. 2 is diagrammatic view of the new X and Y beam laser support structure.

FIG. 2 on the other hand, shows the new arrangement in which the laser tool 10 and the X-axis support structure 18 is mounted to and below the Y-axis support beams 20 and 22 thereby allowing those beam structures to be moved closer together, adding substantial additional rigidity to the housing 24 shown in FIGS. 3 and 4.

Figure 3:
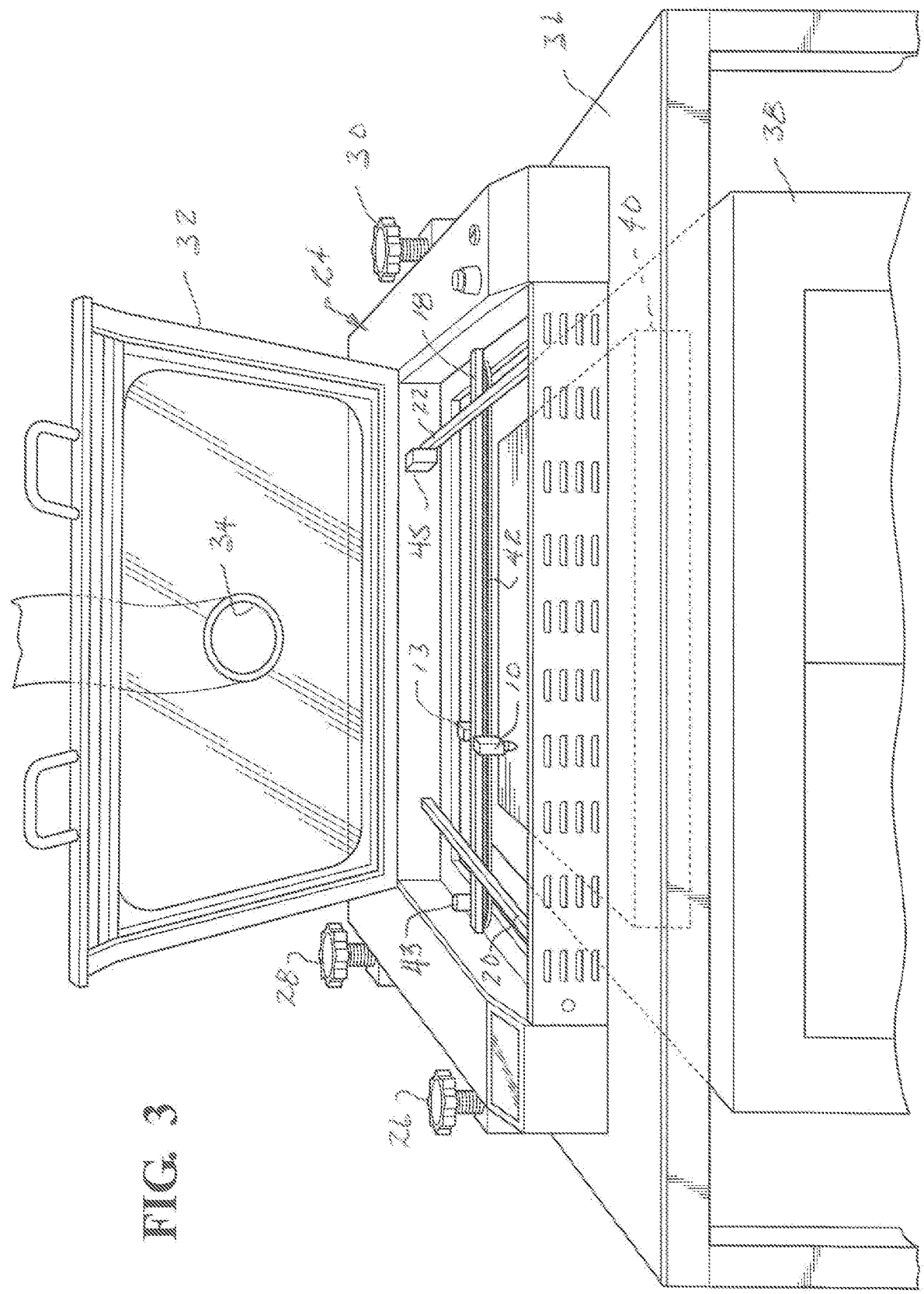
FIG. 3 is a perspective view of a laser machine including a laser cabinet having X and Y engraving tool translation capability and a pair of lasers 10 and 13 mounted for movement in opposite directions on opposite sides of a grooved stepper motor drive belt.
Figure 4:
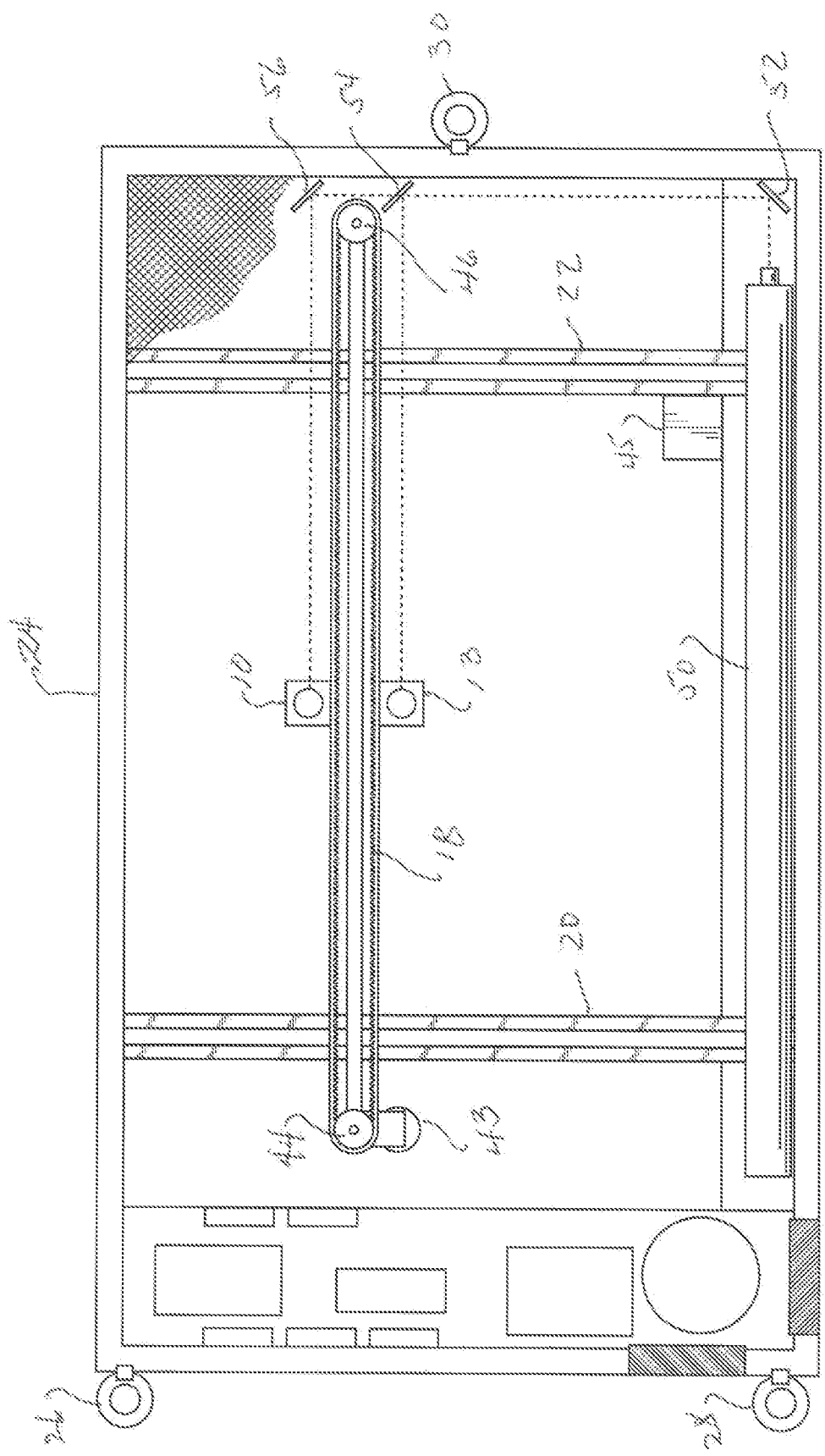
FIG. 4 is a bottom view of the apparatus of FIG. 3 showing the use of two laser in a counterweighted fashion on opposite sides of the X-axis incremental drive belt 42.

Referring to FIGS. 3 and 4, the laser machine 24 is shown to comprise a box-like metal housing with an interior volume adapted to contain the X-axis support structure 18 for the downwardly-aimed laser engraving tool 10 which is moveable along the X-axis by means of a belt 42 mounted on pulleys 44 and 46 driven by a stepper motor 43 as disclosed in my prior patent documents as described above. Y-axis drive is provided by a second stepper motor 45. The housing sits, in this example, on the top surface of a table 36, which is mounted over an elevator table 38 on which the object 40 is to be engraved rests. The elevator table allows the object 40 to be put in place and then raised up into the focal range of the laser tool 10.

However, additional adjustment for both laser focus and the accommodation of any non-level condition in the surface of the object 40 to be engraved, is provided by means of the three-point tool support and guidance system incorporating screw shafts 26, 28 and 30 arranged in a triangular pattern and adjustable in this case by hand to allow leveling of the laser tool translation field so that it parallels the surface of the object 10 to be engraved. Again, this is fully described in my prior art patent.

In accordance with the invention, and the novel subject matter described herein, the Y-axis beams 20 and 22, which extend between and are affixed to the front and rear panels of the housing 24 are mounted closer together without having a negative effect on X-axis translation scope. The Y-axis beams are structurally tied into the front and rear-housing panels adding substantial rigidity to the housing and, as described above, allowing for the use of lighter, less expensive materials of construction.

The cabinet or housing 24 has a hinged lid 32 with an exhaust port 34 connected to an exhaust system (not shown) to evacuate dust and debris as well as smoke from the area where the laser tool 10 is operating. Similar machinery is used where the engraving tool 10 takes the form of a mechanical device such a diamond tip rotary tool. Maximum structural rigidity is provided by locating the Y axis beams 20 and 22 at the one-third and two-thirds distance points between the side panels 23 and 25 of the housing. By way of example, for a housing or cabinet that provides a 48 inch field, the beam 20 is located at least approximately 16 inches from the side panel 23 while beam 22 is 32 inches from the side panel 23 and 16 inches from beam 20. Variations of this spacing are also advantageous and may be necessary to accommodate various factors such as cabinet design and the mounting locations of the various internal components.

As indicated above, another aspect of the innovative subject matter described herein is the addition of a counterweight, here in the form of a second laser tool 13 identical to laser tool 10, mounted on the belt 42 directly opposite; i.e., on the other side of the belt 42 so that as the laser engraving tool 10 moves from right to left during the incremental engraving process, the tool 13 moves from left to right and vice versa. The mass of the counterweight is chosen to be at least substantially equal the mass of the tool and, as will be understood, moves in directions opposite to movement of the tool. This gives rise to a conservation of momentum, which damps out the tendency of a single laser engraving tool 10 to vibrate or flex the belt 42 during the rapid reciprocal incremental movement of the tool during a very fine, high resolution engraving process. The result is substantial improvement in the resolution of the images and other figures to be engraved.

Looking further to FIG. 4, the laser source 50 is shown mounted toward the back of the cabinet and the output is aimed at a mirror 52 which redirects the beam to a second beam-splitter mirror 54 which in turn directs the beam to the laser tool 13. The beam also passes through the mirror 54 to a second mirror 56 which directs the beam to the laser tool 10. It will be understood that two lasers may be used with two sets of mirrors to transmit their respective beams to the tools 10 and 13 so that they may operate essentially independent of one another during an engraving process.

It is to be further understood that the invention has been described with reference to an embodiment which is deemed to be illustrative in nature and that persons skilled in the art will see and understand that various modifications and additions to the subject matter described herein may be made.

What is claimed:

1. A laser engraving device comprising:
   a cabinet having parallel front and rear structural panels and parallel left and right side structural panels;
   said panels being assembled together to define a unitary laser enclosure having an bottom;
   a laser engraver disposed within the cabinet and aimed downwardly through the bottom;
   first and second support beams extending in parallel and between and attached to the front and rear structural panels to define a Y-axis of laser translation;
   said first and second beams being spaced inwardly from and parallel to respective left and right-side panels;
   a third support beam mounted to and under said first and second support beams and extending fully between said side panels to define an X-axis of laser translation extending between and beyond said first and second parallel beams;
   the third support beam comprising a closed loop belt having two parallel adjacent sides;
   a first stepper motor in said third beam configured to translate said laser engraver along an X axis of laser translation within said cabinet extending between and beyond said first and second beams;
   a second stepper motor in one of the said first and second beams configured to directly translate the third beam and said laser engraver along a Y axis of laser translation within said cabinet;
   the laser engraver being mounted to a side of the closed loop belt; and
   a second laser mounted on the other side of the closed loop belt to counterweight the mass of the engraving tool, said laser engraver and said second laser being mounted to opposite sides of said belt to move in opposite directions toward past and away from one another.

2. The laser engraver device as defined in claim 1 wherein the first and second beams are spaced equally inwardly from said side panels by about one third of the total distance between said side panels.

* * * * *